United States Patent [19]

Sampo

[11] 3,750,258

[45] Aug. 7, 1973

[54] INSERTION TOOL FOR TIRE VALVE STEMS

[76] Inventor: John J. Sampo, 14001 Brenan Way, Santa Ana, Calif. 92705

[22] Filed: Sept. 16, 1971

[21] Appl. No.: 181,151

[52] U.S. Cl. .............................................. 29/221.5
[51] Int. Cl. ............................................ B23p 19/04
[58] Field of Search .............. 29/221.5, 222, 203 H, 29/213, 278, 280, 282, 283; 81/15.5, 15.6, 15.7

[56] References Cited
UNITED STATES PATENTS

| | | | |
|---|---|---|---|
| 2,457,930 | 1/1949 | Smith | 29/235 |
| 2,856,677 | 10/1958 | Rekettye | 29/213 |
| 3,387,354 | 6/1968 | Mossberg | 29/221.5 |
| 3,541,664 | 11/1970 | Fogg | 29/222 |

Primary Examiner—Harold D. Whitehead
Assistant Examiner—J. C. Peters
Attorney—Robert E. Strauss

[57] ABSTRACT

A tool for the insertion of valve stems in the wheel rims for tubeless tires is disclosed. The tool avoids the common practice of removing the tire from the rim for replacement or insertion of the valve stem. The tool is entirely hand powered and operated and comprises a push rod slidably mounted in a body sleeve which has a tapered internal wall with a very slight included angle, less than 10°, so that the rod can be pushed with a minimum of force to compress the bulbous end of the stem until it is discharged into the hole of the rim. The discharge face of the sleeve has a tip that inserts into the hole with an outside shoulder that bears against the rim as the rod is pushed through the sleeve to steady the sleeve and hold it in place.

9 Claims, 3 Drawing Figures

PATENTED AUG 7 1973  3,750,258
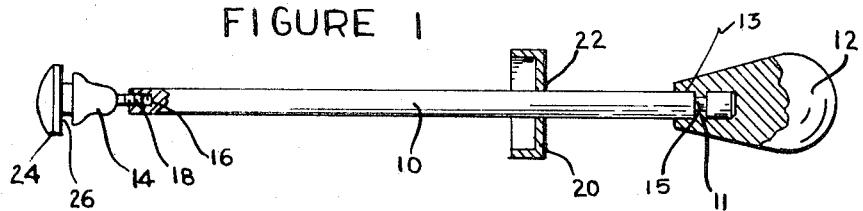
FIGURE 1
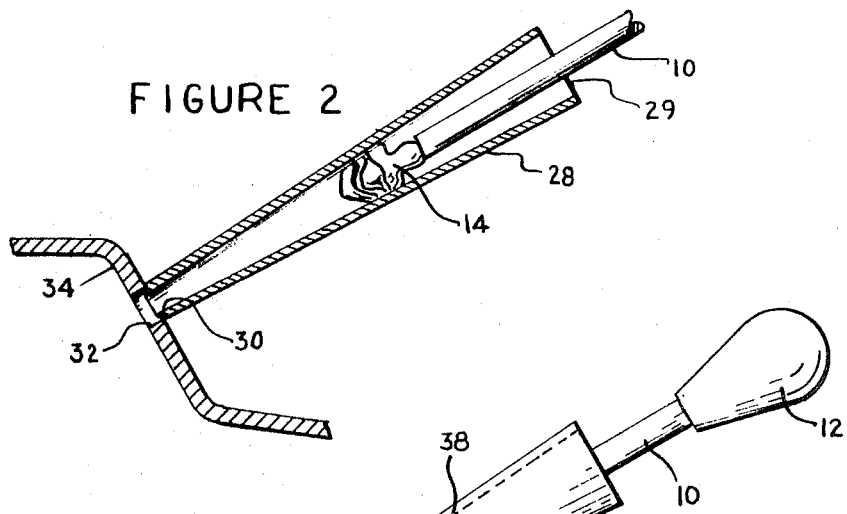
FIGURE 2
FIGURE 3
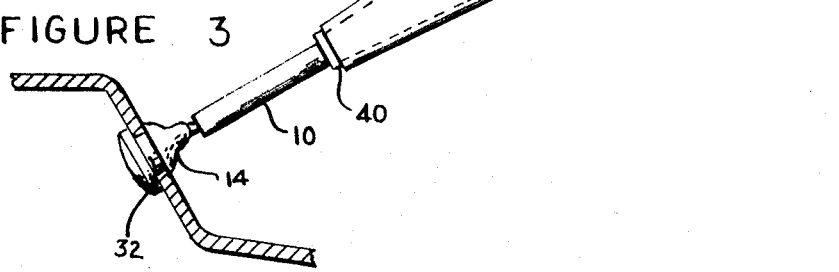
INVENTOR.
JOHN J. SAMPO
BY
Robert Shaums
ATTORNEY

INSERTION TOOL FOR TIRE VALVE STEMS

DESCRIPTION OF THE INVENTION

The invention relates to a tool for inserting an elastic eyelet into a hole and, in particular, to the tool for the insertion of a valve stem for a tubeless tire into the rim of a wheel while the tire remains mounted on the rim.

Tubeless tires having a tire casing mounted on a wheel rim commonly have a valve stem carried by a hole in the rim. The stem has a threaded sleeve for attachment of a cap and a spring biased valve insert is mounted in the stem. Attached to the sleeve is a bulbous portion of an elastic material and a groove is placed about a mid-portion of this elastic material to permit the bulbous portion to seat against the inside and outside faces of the rim. The stems are commonly inserted from the inside of the wheel by inserting the stem through the hole and pulling it until the groove in the bulbous portion seats about the hole. This installation requires that the tire be removed from the wheel.

A number of tools have been proposed for inserting valve stems directly into the rim from the outside of the wheel, thereby avoiding the common practice of removing the tire for replacement of a faulty valve stem. These devices, however, have used complex or cumbersome power assists such as an air pressure actuated tool that is presently on the market or the tools shown in U.S. Pat. Nos. 2,438,642 and 2,457,930. Another device, shown in U.S. Pat. No. 3,387,354 is lever actuated, and forces the stem through a relatively sharply tapered nozzle. In all these units, the tool is self-supporting and the stem can be moved through the narrow nozzle tip of the tool without supporting the tip against any bearing surface.

It has now been found that a greatly simplified tool for the insertion of valve stems can be provided by careful design of the sleeve of the tool. In particular, it has been found that a tool can be provided which functions entirely on unaided or unassisted hand power that is applied to a push rod bearing the stem to force the stem through a tapered sleeve if: (1) the included angle of the taper of the sleeve is less than 10°; and (2) a shoulder is provided on the discharge end of the tool to permit engagement of the discharge end of the tool in the hole of the rim, thereby preventing any sidewise dislodgement of the tool when the user exerts his force on the push rod. The latter element is has been found completely eliminates the necessity that the tool be self-supporting in use.

The tool that comprises the invention disclosed herein, has the following components:

1. a push rod having a handle at one end and bearing, at its opposite end, means for the removable attachment of the threaded end of the valve stem; and 2. a sleeve, bearing at one end the means to engage the hole in the rim of the wheel and a smooth taper extending between cross sections corresponding to the unconfined stem and to the hole in the rim of the wheel.

The sleeve furthermore has a taper with a total included angle which is less than 10° and bears, at its discharge end, a shoulder at an angle no greater than about 60° to the longitudinal axis of the tool and extending about the outside periphery of the discharge end to permit the tip of the tool to be inserted into the hole of the rim with the shoulder engaged in bearing contact against the rim.

The invention will now be described by reference to the FIGS., of which:

FIG. 1 shows the handle and guide cap components of the tool with a valve stem mounted thereon;

FIG. 2 shows the tool placed on the hole in a wheel rim and the stem partly compressed; and FIG. 3 shows the stem in place with the sleeve of the tool withdrawn from the rim.

The FIGURES illustrate the tool in a sequence of steps which correspond to the manner in which the tool is used. FIG. 1 shows the rod 10 of the tool which bears a handle 12 on one end, secured thereto by an internal rib 11 molded into the bore 13 of handle 12. The rod has a groove 15 into which rib 11 engages. Other conventional means such as threads or a pressed fit could also be used. The opposite end of rod 10 bears means for the removable attachment of valve stem 14. Various means can be used; a threaded bore 16 is shown and the conventional threaded sleeve 18 of the stem is turned therein.

If desired, a rod guide 20 can be provided on rod 10. This guide can be cup-shaped as shown with side walls that will engage about the inlet end of the sleeve of the tool. A central bore 22 is provided through the guide and rod 10 passes through the bore to permit the cap to slide freely on the rod. I have found that this guide is not necessary and, for simplicity of the tool, it is not in the preferred assembly. The guide can, however, be used in the tool assembly if desired.

The valve stem is conventional, with sleeve 18 embedded in a body of an elastic material, typically rubber, which has a bulbous end 24 with a peripheral groove 26 around the end. The stem has a central, longitudinal passageway into which is secured the conventional valve means in the form of a threaded insert in sleeve 18.

FIG. 2 shows the tool in use with the sleeve in cross section. Rod 10 has been inserted into the sleeve 28 which is an elongated member having at its inlet end 29 a cross sectional area of the unconfined bulbous portion 24 of valve stem 14. The valve stem is shown partially compressed and in a slightly distorted shape as a result of rod 10 having been advanced to a mid portion of sleeve 28.

The opposite or discharge end 30 of sleeve 28 has a cross sectional area conforming in shape and slightly smaller in area than the cross section of hole 32 in the side flange 34 of the wheel. The internal wall 36 of sleeve 28 extends between its inlet and discharge ends as a smoothly tapered wall with a total included angle which is less than 10°, and, preferably, is from 2 to about 7°. As illustrated, the sidewall has a taper of 4° and extends from a circular inlet having a diameter of 0.875 inch to a discharge having a diameter of 0.433 inch. This is designed for use on the standard size valve stem used on late model American and European cars. This included angle is important in the functioning of the tool since included angles of 10° or greater require too great a force to advance the stem along sleeve 28 and compress it sufficiently to discharge it from the sleeve. The outside wall of sleeve 28 can be any suitable shape; it can be tapered at any angle equal to or different from the inner wall or can be cylindrical, etc. The sleeve will, preferably, be formed by rolling or extruding the sleeve from tubular stock and its sidewalls will, therefore, be slightly thicker at the discharge end, resulting in a lesser taper in the outside walls than in the inside walls.

The discharge end of sleeve 18 bears against the wheel and the force applied to handle 12 is reacted directly on the flange 34. The discharge end of the sleeve can slip or be dislodged from its position opposite hole 32 in the event that the operator fails to align the sleeve exactly perpendicular to flange 34 or applies a force with a sidewise component. Accordingly, means are provided on the discharge end of the sleeve to maintain it in alignment with hole 32. This is shown as shoulder 36 which is shown as a chamfer having an angle of about 45°. Preferably, any shoulder having an angle to the longitudinal axis of the sleeve which is no greater than about 60° will function adequately to retain the sleeve in alignment with hole 32. At angles greater than about 60°, there can be inadequate reaction against the sides of hole 32 to retain the sleeve in alignment when the tool is at an acute angle to hole 32 or when excessive side force is applied.

FIG. 3 illustrates a tool as it is withdrawn from the wheel, following the seating of valve stem 14 in hole 32. This tool has a sleeve 38 which is used with the standard size valve stem of early model American cars and has a circular inlet with a diameter of about 1.00 inch and a discharge of 0.60 inch. The inside side-wall has an included angle of 4°. The sleeve also has an alternative shoulder 40 at its discharge end. This is shown as a peripheral offset shoulder wherein the angle between the shoulder and the axis of the tool is 0°, i.e., the shoulder and the axis of the tool are parallel. The diameter of annular shoulder 40 is preferably slightly less than that of hole 32 to avoid binding of the sleeve in hole 32.

The valve stem 14 is shown with groove 26 in hole 32 and with its bulbous end seated to each side of this hole. The end expands as it enters the wheel and is discharged from sleeves 38 or 28 and the expanded end retains the stem as the sleeve is withdrawn from the hole. The push rod 10 can then be removed from stem 14 and the stem will be mounted on the wheel from the outside of the wheel.

The tool offers considerable advantages over the various prior tools designed to insert valve stems from outside of tires. It is considerably simpler and easier to use since it does not require an extaneous power source but, instead, can be used entirely by hand power. The tool also has no levers or mechanisms to multiply the applied force. Instead, the tool has a sleeve which is tapered at a sufficiently small included angle as to permit seating of the valve stem with a force of about 15 to 80 pounds.

The use of the tool is facilitated by lubrication of the valve stem or inside walls of the tool sleeve. Preferably, a non-hydrocarbon lubricant is used to avoid swelling of any rubber portions of the valve stem. Examples of suitable lubricants are soap, silicon liquids such as are available in spray cans or stick lubricants, etc. A very suitable lubricant is the hand cleaner emulsion commonly used by service stations and garages. When the stem is formed with neoprene or other elastomers which tolerate hydrocarbons, lubricants such as petroleum waxes and oils can be used. The lubricant is preferably applied to the inside surfaces of the sleeve and the valve stem is moistened or wetted with water before insertion into the sleeve.

The invention has been described with reference to illustrated and preferred modes of practice. Other embodiments can of course be used, e.g., the metal sleeve can be replaced with molded or extruded plastic sleeves formed of Nylon, Teflon, Delrin, etc., and any of these can be impregnated with graphite for added lubricity.

While the invention has been described with reference to specifically illustrated and preferred modes of practice, it is not intended that the invention be unduly limited thereby. Instead, it is intended that the invention be defined by the means and their obvious equivalents set forth in the following claims.

I claim:

1. A tool having no more than two operative parts for inserting a valve stem having a threaded tube and a bulbous end into a hole in the rim of a wheel bearing a tubeless tire, said two parts being:
   1. a rod having a handle at one end and bearing, at its opposite end, means for the removable attachment of the threaded tube of the valve stem; and
   2. a sleeve for receiving said rod in reciprocable relationship thereto, having at one of its ends an internal cross section conforming to the shape and at least equal to the cross sectional area of the unconfined bulbous end of the valve stem, at its opposite end an internal cross section conforming to the shape and slightly lesser than the area of the hole in the rim of said wheel, a smoothly tapered wall extending between the ends thereof at a total included angle less than 10°, and a shoulder at an angle no greater than about 60° to the longitudinal axis of said tool and extending about the outside periphery of said opposite end to permit the tip of said opposite end to be inserted into the hole in said rim and said shoulder to be engaged in bearing contact against said rim.

2. The tool of claim 1 wherein said shoulder comprises a chamfered end with an angle of about 45°.

3. The tool of claim 1 wherein said shoulder comprises a peripheral offset shoulder.

4. The tool of claim 1 wherein said included angle is from 2° to about 7°.

5. The tool of claim 1 wherein said sleeve is conical.

6. The tool of claim 5 wherein said sleeve has a diameter at one end of 0.875 inch and a diameter at the opposite end of 0.433 inch.

7. The tool of claim 1 wherein said sleeve has a diameter at one end of 1 inch and a diameter at the opposite end of 0.6 inch.

8. The tool of claim 1 wherein said rod is completely removeable from said sleeve.

9. A tool having no more than three operative parts for inserting a valve stem having a threaded tube and a bulbous end into a hole in the rim of a wheel bearing a tubeless tire, said three parts being:
   1. a rod having a handle at one end and bearing, at its opposite end, means for the removable attachment of the threaded tube of the valve stem;
   2. a sleeve for receiving said rod in reciprocable relationship thereto, having at one of its ends an internal cross section conforming to the shape and at least equal to the cross sectional area of the unconfined bulbous end of the valve stem, at its opposite end an internal cross section conforming to the shape and slightly lesser than the area of the hole in the rim of said wheel, a smoothly tapered wall extending between the ends thereof at a total included angle less than 10°, and a shoulder at an angle no greater than about 60° to the longitudinal axis of said tool and extending about the outside periphery of said opposite end to permit the tip of said opposite end to be inserted into the hole in said rim and said shoulder to be engaged in bearing contact against said rim; and 3. a cup-shaped rod guide member having a central bore surrounding said rod and side walls that removably engage about the inlet end of said sleeve.

* * * * *